United States Patent
Girard et al.

(10) Patent No.: US 7,168,625 B2
(45) Date of Patent: Jan. 30, 2007

(54) MAKING SECURE DOWNLOADED APPLICATION IN PARTICULAR IN A SMART CARD

(75) Inventors: Pierre Girard, La Destrousse (FR); Benoit Gonzalvo, Ceyreste (FR)

(73) Assignee: Gemplus, Gemenos (FR)

( * ) Notice: Subject to any disclaimer, the term of this patent is extended or adjusted under 35 U.S.C. 154(b) by 213 days.

(21) Appl. No.: 10/520,434

(22) PCT Filed: Jul. 7, 2003

(86) PCT No.: PCT/FR03/02107

§ 371 (c)(1),
(2), (4) Date: Jan. 7, 2005

(87) PCT Pub. No.: WO2004/006088

PCT Pub. Date: Jan. 15, 2004

(65) Prior Publication Data

US 2005/0218234 A1   Oct. 6, 2005

(30) Foreign Application Priority Data

Jul. 8, 2002  (FR) .................... 02 08643

(51) Int. Cl.
*G06K 19/06* (2006.01)

(52) U.S. Cl. ...................... 235/492; 235/487

(58) Field of Classification Search ................ 235/492, 235/487, 380, 379, 383
See application file for complete search history.

(56) References Cited

U.S. PATENT DOCUMENTS 6,031,910 A * 2/2000 Deindl et al. ............... 380/255
6,357,665 B1 * 3/2002 Peachman et al. .......... 235/492

FOREIGN PATENT DOCUMENTS

| EP | 0 821 326 | 1/1998 |
| EP | 0 949 595 | 10/1999 |
| WO | 99 38131 | 7/1999 |
| WO | 99 40548 | 8/1999 |

* cited by examiner

*Primary Examiner*—Michael G. Lee
*Assistant Examiner*—Allyson N Trail
(74) *Attorney, Agent, or Firm*—Buchanan Ingersoll & Rooney, PC

(57) ABSTRACT

The invention concerns a method for differentiating between data and instructions thereby providing against certain attacks in a data processing device such as a smart card, whereby a generator associates a random number with an applicative component of a downloaded application, and a transformer in a virtual machine applies each of the instruction words in the component and the associated random number to a transformation function so as to store the transformed instruction words when downloading the component. A second transformer applies each of the transformed words of part of the component and the associated random number to the reciprocal function of the transformation function so as to retrieve the instruction words constituting the component part, to execute the same.

12 Claims, 4 Drawing Sheets

MAKING SECURE DOWNLOADED APPLICATION IN PARTICULAR IN A SMART CARD

This disclosure is based upon French Application No. 02/08643, filed Jul. 8, 2002, and International Application No. PCT/FR2003/002107, filed Jul. 7, 2003, the contents of which are incorporated herein by reference.

BACKGROUND OF THE INVENTION

The present invention relates to enabling the execution environment of an interpreter, such as a virtual machine, to be made secure in a data-processing device of the portable electronic type, such as a smart card.

More particularly the invention relates to providing protection from attacks for executing items of data as if they were instructions (opcodes). A typical attack consists, for example, in executing an undesired jump to a memory zone that has recorded items of data. That results, for example, in pseudo-codes in a downloaded application, such as an applet, being modified by an attacker in order to insert an "aggressive" applet into a data field and thus to insert a jump towards that portion of data. The virtual machine, which is not capable of distinguishing between instructions and data, then executes the items of data as if they were instructions.

SUMMARY OF THE INVENTION

An object of the invention is to protect operation of the virtual machine from such attacks, and more precisely to distinguish between instructions and data, in particular when executing a portion of a downloaded application.

A data-processing device of the invention comprises storage means for storing at least one downloaded application that is initially compiled in an intermediate language, and that is made up of a plurality of application components, each of which contains an identifier and instruction words, and virtual execution means. Said device is characterized in that it further comprises:

- random number generator means for associating a random number with a predetermined application component of the downloaded application;
- first transformer means included in the virtual execution means for applying each of the instruction words in the predetermined application component and the associated random number to a transformation function in order to store transformed instruction words during downloading of the predetermined application component; and
- second transformer means included in the virtual execution means in order to apply each of the transformed instruction words of a portion of the predetermined application component and the associated random number to the reciprocal function of the transformation function in order to retrieve the instruction words making up said predetermined application component in order to execute said component portion retrieved in this way.

For example, the predetermined application component includes a succession of methods, as a portion of the component, whose instruction words, such as operation code bytes and parameter bytes, are systematically subjected to transformation into transformed instruction words before they are recorded permanently in the data-processing device. This makes it possible to distinguish the instructions from the data. For example, a jump inserted fraudulently into a downloaded application does not make it possible to lead to a looked-for item of data because execution of the jump takes place relative to an item of data that is deemed to be transformed and that does not correspond to the looked-for jump.

In order further to accentuate the distinction between the code instructions and the data, the generator means generate a random number produced by the virtual execution means, and the first transformer means act, e.g. when the virtual execution means are creating an object, to apply each item of data and the associated random number to the transformation function in order to write an item of transformed data into the storage means when the data is produced by the virtual execution means. In a variant, the invention makes provision to distinguish between different items of data as a function of the primitive data types. In this variant, the generator means generate random numbers associated with respective primitive data types, and the first transformer means apply each item of data produced by the virtual execution means and the random number associated with the primitive type of the data to the transformation function in order to write our item of transformed data into the storage means when the data is produced by the virtual execution means.

Other characteristics and advantages of the present invention appear more clearly on reading the following description of preferred embodiments of the invention given with reference to the accompanying drawings, in which:

DETAILED DESCRIPTION

Figure 1:
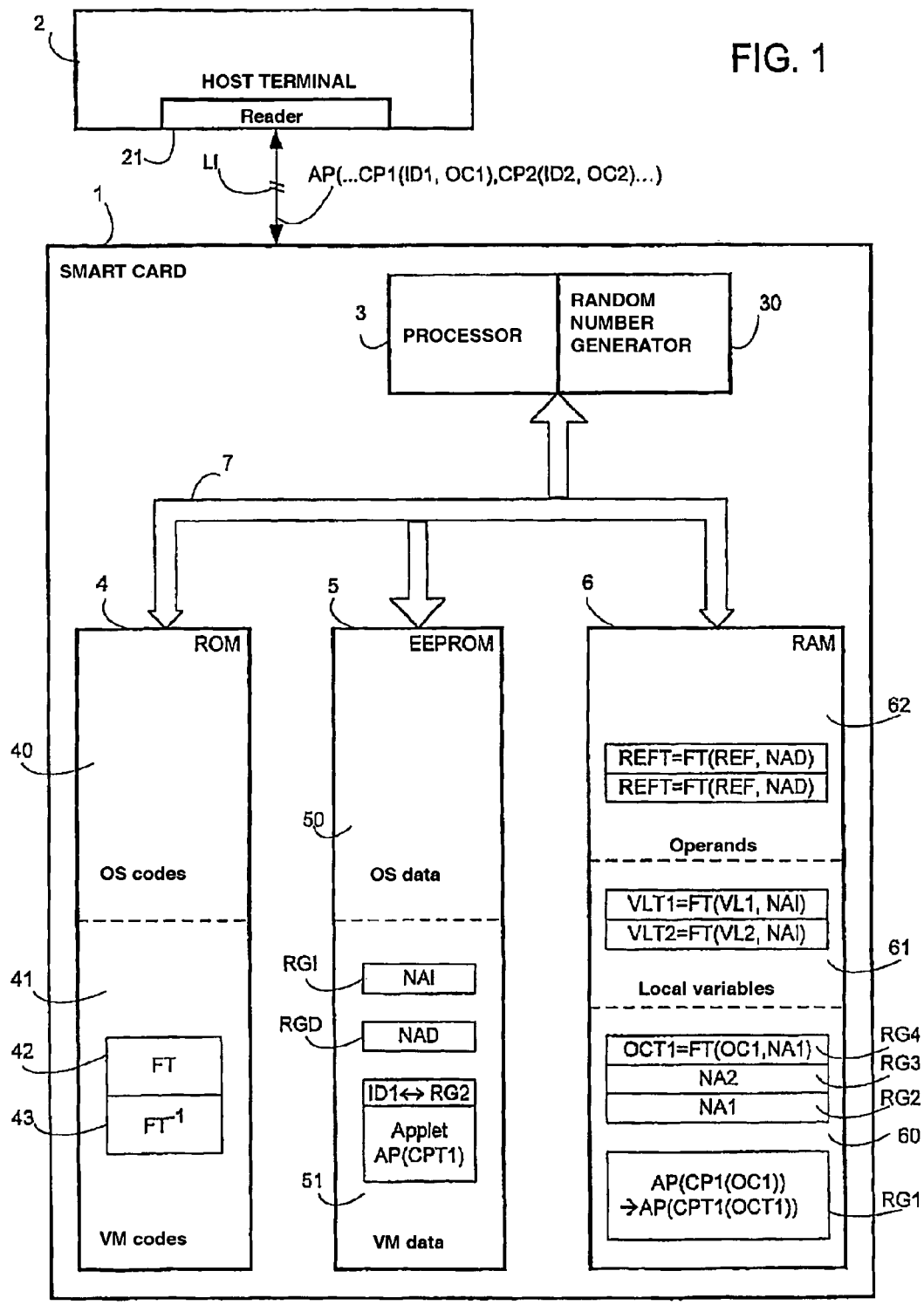
FIG. 1 is a block diagram of a data-processing device of the smart card type of the invention.

Reference is made below to a smart card 1, also referred to as a "microcontroller card" or as an "integrated circuit" card, as a portable electronic object removably received in a reader 21 of a host platform such as a host terminal 2. The smart card 1 is of any known type of contact or contactless smart card, and it can be a credit card, a telephone card, an additional card, a removable telephone subscriber identity module (SIM), a games card, etc.

The host terminal 2 can be a personal computer (PC) or a bank terminal or a point-of-sale terminal, or else a mobile cellphone terminal, or a portable electronic object such as a personal digital assistant (PDA) or an electronic purse.

As a data-processing device, the microcontroller in the smart card 1 comprises a microprocessor 3, a non-rewritable memory 4 of the read-only memory (ROM) type, a non-volatile memory 5 of the electrically erasable programmable read-only memory (EEPROM) type, and a random access memory (RAM) 6. All of the components 3 to 6 in the smart card 1 are interconnected by a bus 7 internal to the card and a communications interface connected to the reader 21 in the host terminal 2 via a contact or contactless link LI.

Spaces 40 and 41 of the memory 4 contain instructions respectively in the native code of an operating system (OS) and in the pseudo-code (bytecode) of a virtual machine (VM), as virtual execution means, used by the operating system. The pseudo-codes result from compiling a program in a high-level source language of the object-oriented type, such as, for example, the Java Card language. For example, a server (not shown) including a compiler converts the Java Card source language program into a program compiled in an intermediate language, i.e. in pseudo-codes which are instruction words formed by bytes and referred to as "bytecodes", and which are ready for being executed by the virtual machine VM, as interpreter in the smart card 1. The compiled program constitutes an application (AP) referred to as an "applet", downloaded into the smart card in the sense of the invention. The memory 4 also includes at least authentication and communications applications internal to the card.

Spaces 50 and 51 of the non-volatile memory respectively contain data relating to the operating system OS and accessible by native codes, and data relating to the virtual machine VM and accessible by pseudo-codes, as well as the pseudo-codes and the data of applications downloaded into the card. The memory 5 also contains personal data relating to the holder of the smart card.

The memory 6 of the RAM type essentially contains data exchanged with the world outside the smart card 1, in particular with the host terminal TE.

In particular, the memory 6 includes a predetermined space of fixed size for receiving one or more downloaded applications AP such as applets or portions of application, from a server via the host terminal 2 and the link LI so as to be executed by the virtual machine VM. The predetermined space is subdivided into three memory spaces 60, 61, and 62.

The space 60 serves mainly as a buffer memory for receiving machine data, such as a downloaded application AP and for transforming it in accordance with the invention into a transformed application which is written into the memory space 51 of the memory 5 that is reserved for data of the virtual machine VM.

The other two memory spaces 61 and 62 are reserved for first portions of methods invoked in applications including local variables VL and for second portions having variable sizes and including the operands OP of the invoked methods. Invoking a method on the top of the resulting stack in the memory 6 under the control of the processor 3 causes a respective frame to be stacked on the top of the stack that contains the other method frames. The methods invoke one another, the preceding method invoking the next method, and it being possible for the next method only to return to the preceding method, by unstacking and taking away the method from the top of the stack. Thus, only that method which is on the top of the stack is active.

For example, the width of the stack is equal to one byte, i.e. equal to the length of one pseudo-code.

In the prior art, one or more local variables VL in the memory space 61 are declared on implementation of a method and before said method is executed. The local variables serve to execute the method, their number not being modified but it being possible for their values to be modified during execution of the method. As explained below, by way of example, a local variable can be a reference to an object whose method is called in order to access said object in the virtual machine VM, or else parameters of the method or other local variables.

Also in the prior art, operands in the memory space 62 are values used by the virtual machine VM for executing forthcoming operations and in particular used as arguments for calling the method invoked. Operands of a method can become local variables of the next method on implementation of the next method, and conversely the result of a method can become an operand of the immediately preceding method when returning to said immediately preceding method.

An application (applet) is in the form of programs compiled and structured into a plurality of software application components CP, each of which comprises a succession of bytes (bytecodes).

Each byte conveys an operation code (opcode) constituting an instruction (IN) proper, or else one of the parameters (PA) or "operands" of an instruction. An instruction proper is thus made up of an instruction byte IN (opcode) which is optionally followed by one or more parameter bytes PA.

The application to be downloaded and to which reference is made below by way of example is in the form of a compiled file of the cap.file type, and it includes, in particular, a method component CP1 which contains all of the methods of the application AP to be downloaded. Each method has a fixed length and includes a plurality of consecutive groups, each of which has an instruction byte IN and a predetermined number of parameter bytes PA. Another component CP2 of the application AP can be a static field component that contains all of the static fields of the classes of the application. A static field is a field that belongs to a class independently of any instance and is not an instance of an object of the class, and is thus shared by all of the instances of the class. A static field is like an attribute associated with all of the objects of a class.

In accordance with the invention, and as shown also in FIG. 1, the smart card 1 further includes a random number generator 30 and two logic transformers 42 and 43.

In the embodiment shown, the generator 30 is implemented in hardware form in or in association with the microprocessor 3 of the smart card. It exchanges requests and responses via the bus 7 with the virtual machine VM in the memory space 40 in order to generate random numbers NA. For example, the generator 30 associates a random number with a predetermined application component in the application AP on loading said application, or else with data, in particular for object creation, as explained below.

In another embodiment, the random number generator is included in software form in the virtual machine VM, i.e. in the memory space 40.

Each time the random number generator 30 generates a random number NA, the generated random number NA is written in a register RG included in the machine data space 60 in the RAM 6, under control from the virtual machine VM. The virtual machine makes the value of the pointer in the memory 6 at the register RG correspond to an identifier ID included in a header of the component CP with which the random number NA is associated. The correspondence between the identifier ID and the register RG is written in the memory space 51 allocated to the virtual machine VM in the EEPROM 5.

The transformers 42 and 43 are implemented previously in software form in the memory space 41 of the ROM 4, and are thus included in the virtual machine VM.

The first transformer 42 transforms a predetermined application component CP1 into a transformed component CPT1=FT(CP1, NA1) resulting from the predetermined component CP1 and a random number NA1 that is associated therewith being applied to a transformation function FT.

For example, such a transformation is performed byte-by-byte on all of the bytes OC1 of the predetermined component CP1 when loading said component into the machine data memory space 60 in the RAM 6 or on each operand when writing an operand, such as an object reference REF, in the operand space 62 when creating an object.

Conversely, when a method is to be executed or when an operand of an object is to be read from the space 62, a transformation $FT^{-1}$ that is the reciprocal of the transformation FT and that is included in the transformer 43 transforms the transformed bytes OCT1 in a transformed component method, or the transformed operand, such as the transformed object reference REFT, into the initial bytes $OC=FT^{-1}(OCT, NA1)$ of the component CP or into the reference $REF=FT^{-1} REFT,NAD)$ by applying the transformed bytes OCT or the transformed reference REFT and the associated random number NA1, NAD to the reciprocal function $FT^{-1}$.

In a preferred embodiment, the transformation function FT is the Exclusive OR (XOR) function, and therefore the corresponding reciprocal function $FT^{-1}$ is also the Exclusive OR function.

In other variants, numerous other reversible logic transformation functions FT can be chosen for implementing the invention. For example, the function FT can be multiplication of a byte and of a random number, and the function $FT^{-1}$ is then the corresponding division; or the function FT can be addition of a byte and of a random number and the function $FT^{-1}$ is then the corresponding subtraction; or indeed the function FT can be a shift by a number of bits to one side, right or left, in a byte OC, the number of bits determining the shift being equal to a random number NA less than the number of bits of the byte, and the reciprocal function $FT^{-1}$ is then a leftward or rightward shift by the number of bits NA in the transformed byte OCT.

More generally, the transformers 42 and 43 can process instruction words of constant length made up of a plurality of bytes to transform, instead of merely processing single bytes, such words corresponding, for example, to complete instructions.

Figure 2:
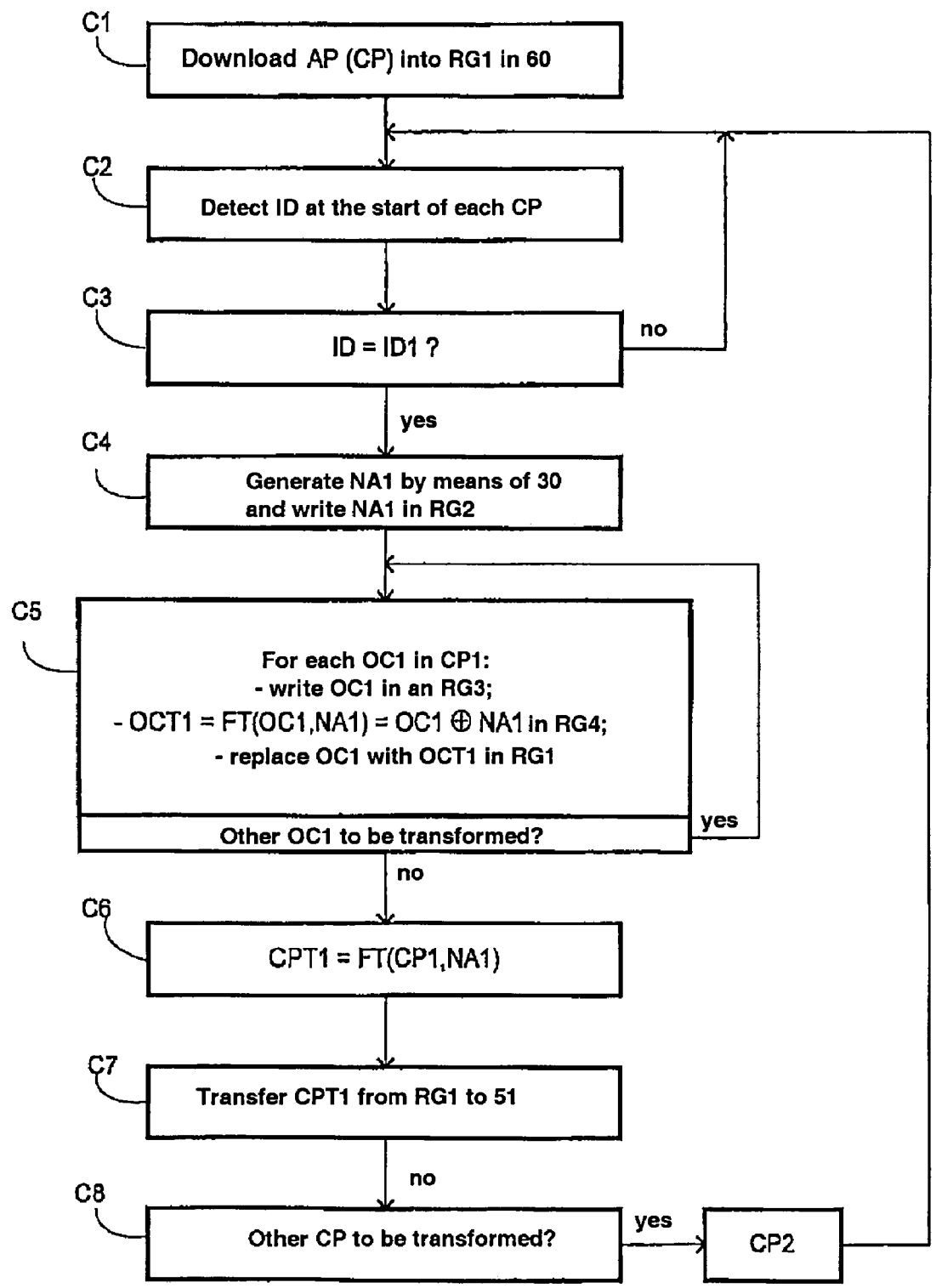
FIG. 2 shows an algorithm for loading an application into the data-processing device of the invention.

With reference to FIG. 2, downloading an application AP into the smart card 1 essentially comprises steps C1 to C8. Conventionally, the application AP made up of a plurality of software components CP is written progressively into a register RG1 of the machine data memory space 60 in the RAM 6. The next steps C2 to C7 are performed progressively as the application AP is downloaded, until a transformed component thereof is transferred from the RAM 6 to the EEPROM 5 in step C7.

It is assumed that the transformation of the invention is applied only to at least one predetermined component CP1 in the application AP to be downloaded, as designated by an identifier ID1 in the header of the component CP1. The virtual machine VM detects the identifiers ID at the start of each component CP of the application AP in the step C2 in order to trigger the random number generator 30, as indicated in step C3, once the virtual machine has detected the identifier ID1 of the component CP1. In step C4, the generator 30 generates a random number NA1 which is written into a register RG2 in the space 60 of the ROM 6 and the virtual machine VM associates the identifier ID1 with pointer value related to the register RG2 while writing this correspondence into the space 51.

In step C5, for each byte OC1 in the component CP1 being loaded, the virtual machine VM writes the byte OC1 into a buffer register RG3 of the memory space 60, the transformer 42 applies the byte OC1 read from the register RG3 and the random number NA1 read from the register RG2 to the transformation function FT, such as the Exclusive OR function, and writes the result OCT1=FT(OC1, NA1) in a register RG4 of the space 60, and finally the virtual machine VM replaces the byte OC1 in the register RG1 with the corresponding transformed byte OCT1 read from the register RG4. Once all of the bytes OC1 have been transformed into bytes OCT1, the register RG1 contains the transformed component CPT1=FT(CP1,NA1), as indicated in step C6. The transformed component CPT1 is then transferred from the register RG1 to the space 51 of the EEPROM 2.

The steps C2 to C7 are repeated for any other component CP2 to be transformed of the downloaded application AP. The generator 30 generates a random number NA2 which associates it with the component CP2 and writes it into another register in the memory space 60 in order to transform each byte OC2 of the component CP2 into a transformed byte OCT2=FT(OC2,NA2). For example, the component CP2 is a static field component that contains static fields of the classes of the application AP.

In a variant, instead of applying the transformation function FT to one byte, the transformation function is applied to a predetermined number of bytes. For example, in the component CP1, if each of the instructions comprises one instruction byte IN followed by two parameter bytes PA, each word M1=(IN, PA, PA) in the component CP1 is transformed into a transformed word MT1=FT(M1,NA1) resulting from applying the word M1 and the random number NA1 associated with the component CP1 to the transformation function FT.

Thus, the virtual machine VM loads the component CP1, CP2 into the smart card 1 while masking it randomly.

In a variant, when the application or a component thereof has a relatively large size and cannot be loaded in full into the RAM, the application is subdivided into portions of constant size, such as packets. The loading steps C4 to C47 relate to each portion so as to transform the portions of the application successively. When a portion constitutes a transition between two concatenated components, each fraction of the portion at the end or at the beginning of the component is recognized and processed separately by the steps C4 to C7. Each portion is loaded and transformed and finally transferred into the space 51 of the EEPROM memory 5, before downloading the next portion into the RAM 6.

Figure 3:
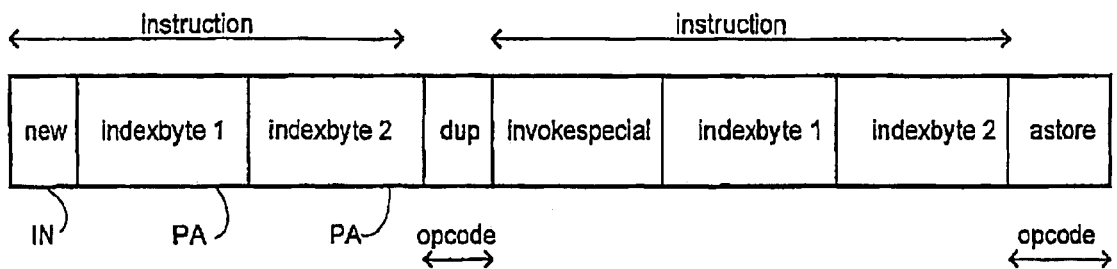
FIG. 3 is a diagram showing a succession of instructions, in particular for creating an object.

In accordance with the invention, creation of an object, for example during execution of instructions in an internal application, as shown in FIG. 3, causes data relating to the creation of the object to be transformed, and, in particular, causes at least one reference REF to the created object to be transformed into a transformed reference REFT without requiring reciprocal transformation of the transformed reference REFT.

Figure 4:
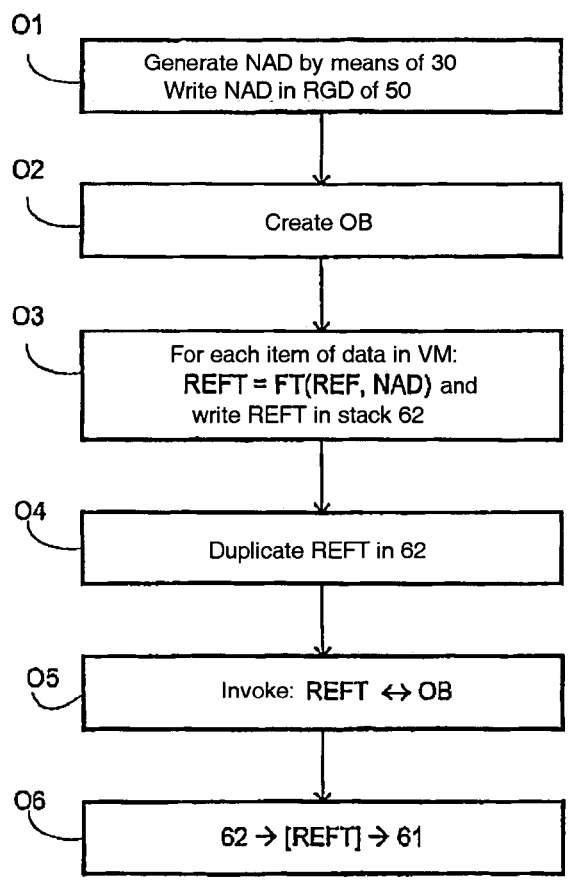
FIG. 4 is an algorithm for creating an object using the instructions of FIG. 3.

In FIG. 3, the first instruction "new" in an operation code byte (opcode) followed by two parameter bytes "index-bytes" is executed firstly in order to create an object OB in a step O2 using the algorithm shown in FIG. 4. Prior to that, in a step O1, if no random number has been associated with an item of data, the virtual machine VM triggers generation of a random number NAD in the generator 30 in order to write it into a register RGD included in the machine data space 51 of the EEPROM memory 5. More generally, in this embodiment, each time that an item of data is written into the RAM space 61 or 62 by the virtual machine VM, the random number NAD serves to transform said data.

Returning to the step O2, the parameters associated with the instruction "new" serve to reserve space in the memory 5 that is necessary for the object OB created by the virtual machine VM and to find all of the information for the object to be created. The parameters represent an index that makes it possible to retrieve information from a table contained in the "constant_pool" field contained in the virtual machine. The object constructor in the virtual machine returns a reference REF which acts as address for the describer of the created object.

In accordance with the invention, the reference REF is transformed into a reference REFT that is written on the top of the stack of the operand space 62 in the RAM 6. Thus, in the next step O3, the virtual machine VM applies the reference REF of the created object and the random number NAD associated with the data to the transformation function FT in the transformer 42 in order to produce the transformed reference REFT=FT(REF,NAD).

By way of example, the next steps O4, O5, and O6 concern manipulations of the transformed reference REFT, and not manipulations of the reference REF, in the RAM 6 by the virtual machine VM. In step O4, the next instruction "dup" duplicates the transformed reference REFT in the memory space 62 by adding a copy of the reference REFT to the stack of operands. This duplication relates to creating another object identical to the object OB that has just been created in the same class. In the next step O5, the instruction "invokespecial" having two parameters as shown in FIG. 3 calls the constructor of the created object OB in order to associate the transformed reference REFT with the object created internally in the virtual machine VM. Then the instruction "astore" in the step O6 transfers the remaining transformed reference REFT from the operand memory space 62 into the local variable memory space 61 in the RAM 6 in order to manipulate the object, e.g. for calling a method applicable to said object.

Thus, in accordance with the invention, any reference REF to an object is stored in its transformed form REFT depending on the random number NAD in the RAM 6. More generally, this transformation is applicable to all of the fields of the object and to all of the items of data.

In a variant, the random number generator 30 generates random numbers associated with respective primitive data types. For example, when creating an object, the virtual machine VM applies one or more of the following transformations to data INT of the integer type, CHAR of the character type, BOOL of the Boolean type (true/false), REF of the reference type, and D for all of the other types of data (float, double, etc.):

| | |
|---|---|
| INTT = | FT (INT, NAI); |
| CHART = | FT (CHAR, NAC); |
| BOOLT = | FT (BOOL, NAB); |
| REFT = | FT (REF, NAR); and |
| DT = | FT (D, NAD). |

In these relationships, the transformed data INTT, CHART, BOOLT, REFT and DT result respectively from transformations FT in the transformer 42 by applying the corresponding initial item of data and a respective random number NAI, NAC, NAB, NAR, and NAD. Thus, each time an application is instantiated, each item of primitive data INT, CHAR, BOOL, Ref, D and the associated random number NAI, NAC, NAB, NAR, NAD are applied by the transformer 42 to the transformation function FT in order to write an item of transformed data INTT, CHART, BOOLT, REFT, DT into the RAM 6.

This contributes to remedying any attacks that undesirable operations attempt to have executed on data of different primitive types; the attacker cannot predict how an item of data will be recorded, which prevents said attacker from performing the attack. For example, addition of two non-transformed references in the space 62 using the prior art technique makes it possible to access an item of data, in particular an item of sensitive data. In the invention, addition of two transformed references gives a result that is completely different from addition of the two non-transformed initial references and that, a priori, is totally random. Since the instructions are also typed in the virtual machine, any attempt at addition, e.g. of the integer type, of two transformed references REFT further accentuates the difference between the result obtained and the sum of the two initial references obtained by the reference-type addition operator.

By way of example, reference is made below, for execution of a method of the downloaded application AP, to data INT of the integer type associated with the random number NAI written initially in the register RGI of the space 51, while also being aware that the manipulated data can be data of any primitive type CHAR, BOOL, REF, and D, and the random number NAI can be the respective random number NAC, NAB, NAR, and NAD.

Figure 5:
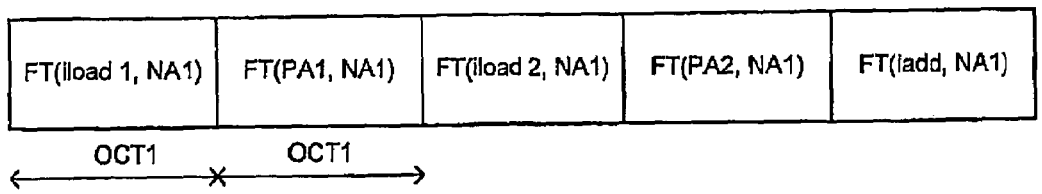
FIG. 5 is a diagram of transformed instructions in a method of executing an addition of two local variables depending on the loaded application.
Figure 6:
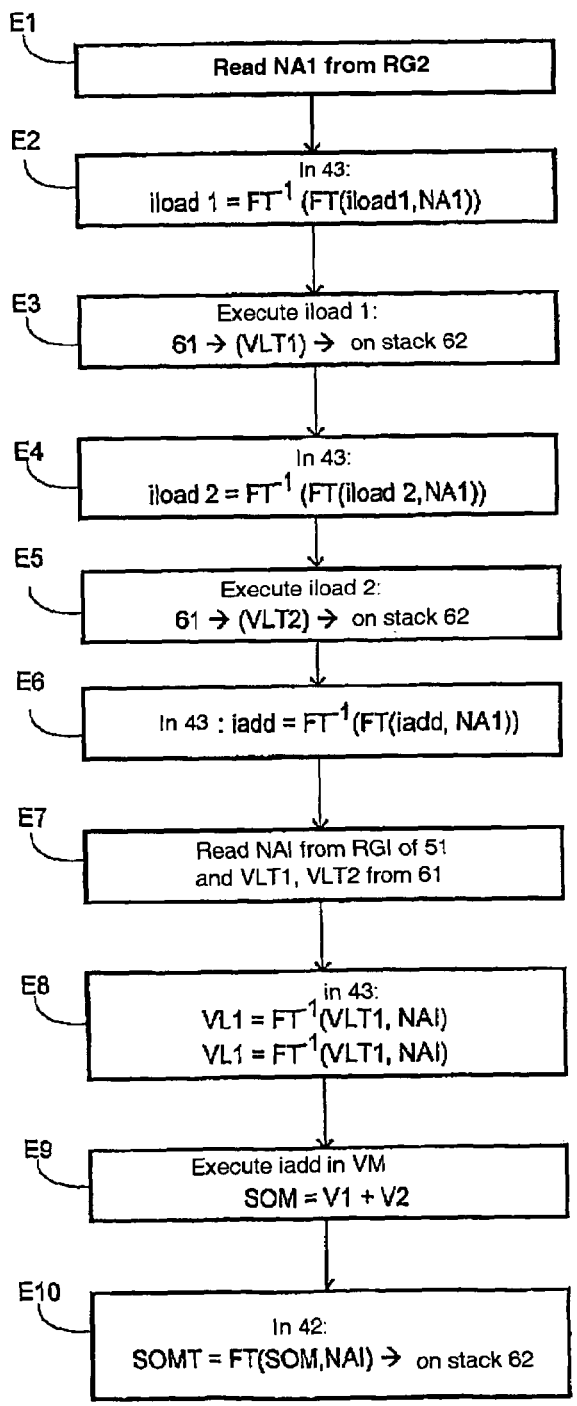
FIG. 6 is an algorithm for executing the method with the transformed instructions shown in FIG. 5.

With reference to FIGS. 5 and 6, execution of the downloaded application AP in the smart card C1 is described, for example for a portion of the application component CP1 that relates to a method comprising three instructions in the component CP1 whose bytes have been transformed as a function of the random number NA1 in step C5 (FIG. 2). In FIG. 5, the method of the application stored in the memory space 51 comprises six transformed bytes OCT. The first two transformed bytes contain the transformed operation code and a parameter of a transformed instruction corresponding to the loading instruction "iload 1" of integer type relating to a first local variable VL1 recorded in the transformed form VLT1=FT(VL1,NA1) in the local variable memory space 61. Similarly, the third and fourth transformed bytes OCT in the method shown in FIG. 5 correspond to a load instruction "iload 2" of integer type relating to a second variable VL2 recorded in the transformed form VLT2=FT (VL2,NAI) in the memory space 61. The fifth byte of the method is a transformed byte OCT of an instruction "iadd" designating an addition of the two variables VL1 and VL2 of integer type.

As shown in FIG. 6, execution of the addition method having five transformed bytes OCT that is shown in FIG. 5, essentially comprises steps E1 to E10.

Firstly, in order to execute the first two load instructions, the virtual machine VM reads the random number NA1 from the register RG2 of the memory space 60, in step E1, the random number NA1 having been produced initially by the generator 30 during loading of the application AP.

In step E2, each of the transformed bytes of the "iload 1" instruction is applied with the random number NA1 to the reciprocal function $FT^{-1}$ in the transformer 43 which produces the initial instruction "iload 1". The virtual machine VM then executes the "iload 1" instruction by loading the transformed variable VLT1=FT(VL1,NAI) on the top of the stack of operands in space 62 of the RAM 6.

Then, the instruction "iload 2" is processed in steps E4 and E5 in the same manner as the preceding instruction "iload 1" is processed in steps E2 and E3, firstly by retrieving the initial instruction "iload 2" from the transformer 43, then by executing the instruction "iload 2" in order to transfer the transformed variable VLT2=FT(VL2, NAD) to above the preceding transformed variable VLT1 in the stack in the space 62.

The step E6 is analogous to the preceding steps E2 and E4 in order to retrieve the third instruction "iadd" by applying the random number NA1 and the fifth transformed byte in the method shown in FIG. 5 to the reciprocal function FT in the transformer 43.

Since the addition operation "iadd" can be executed only on the initial local variables, the two local variables to be added VL1 and VL2 are retrieved firstly by reading the random number NAI from the register RGI in the memory space 51, or, in a variant, the random number NAD associated with all of the primitive types of data in the register RGD of the memory space 51. The virtual machine then reads the transformed local variables VL2 and VLT1 on top of the stack in the space 62, and, in the step E8, applies each of them to the reciprocal function $FT^{-1}$ in the transformer 43 in order to retrieve the initial local variables VL1 and VL2 which are written in two registers of the arithmetic logic unit in the virtual machine VM. The arithmetic unit executes the instruction "iadd" in order to add the local variables VL1 and VL2 to form a sum SOM in step E9. The transformer 42 transforms the sum SOM by applying it with the random number NAI, or, in a variant, NAD, to the transformation function FT in the transformer 42 which produces the transformed sum SOMT in the step E10. Finally, the transformed sum SOMT is positioned on the top of the stack in the memory space 62 of the RAM 6.

The invention claimed is:

1. A data-processing device comprising storage means for storing at least one downloaded application that is initially compiled in an intermediate language, and that is made up of a plurality of application components, each of which contains an identifier and instruction words, and intermediate-language virtual execution means, said device further comprising:

random number generator means for associating a random number with a predetermined application component of the downloaded application;

first transformer means included in the virtual execution means for applying each of the instruction words in the predetermined application component and the associated random number to a transformation function in order to store transformed instruction words during downloading of the predetermined application component; and second transformer means included in the virtual execution means in order to apply each of the transformed instruction words of a portion of the predetermined application component and the associated random number to the reciprocal function of the transformation function in order to retrieve the instruction words making up said predetermined application component in order to execute said component portion retrieved in this way.

2. A device according to claim 1, in which the instruction words are operation code bytes and parameter bytes.

3. A device according to claim 1, in which each instruction word has a constant length and corresponds to a complete instruction.

4. A device according to claim 1, further comprising second storage means for storing the downloaded application including the predetermined application component with transformed instruction words.

5. A device according to claim 1, in which the generator means generate a random number produced by the virtual execution means, and the first transformer means apply each item of data and the associated random number to the transformation function in order to write an item of transformed data in the storage means when the data is produced by the virtual execution means.

6. A device according to claim 1, in which the generator means generate random numbers associated with respective primitive data types, and the first transformer means apply each item of data produced by the virtual execution means and the random number associated with the primitive type of the data to the transformation function in order to write the other item of transformed data into the storage means when the data is produced by the virtual execution means.

7. A device according to claim 1, in which the generator associates respective random numbers to identifiers of different types of component so that the instruction words in each component are applied to the transformation function with the random number that is associated with the component.

8. A device according to claim 1, in which the transformation function and the reciprocal function are Exclusive-OR functions.

9. A device according to claim 1, in which the random number generator means are included in or in association with a processor in the device.

10. A device according to claim 1, in which the random number generator means are included in the virtual execution means.

11. A device according to claim 1, in which the storage means are constituted by a random access memory containing data exchanged with an apparatus external to the device.

12. A device according to any claim 1, of the portable electronic type, such as a smart card.

* * * * *